US011593865B2

(12) United States Patent
Foster et al.

(10) Patent No.: US 11,593,865 B2
(45) Date of Patent: Feb. 28, 2023

(54) CUSTOMER EXPERIENCE

(71) Applicant: X Development LLC, Mountain View, CA (US)

(72) Inventors: Nicholas John Foster, Oakland, CA (US); Carsten Schwesig, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 801 days.

(21) Appl. No.: 15/721,069

(22) Filed: Sep. 29, 2017

(65) Prior Publication Data

US 2019/0102827 A1    Apr. 4, 2019

(51) Int. Cl.
*G06Q 30/00*      (2012.01)
*G06Q 30/0601*    (2023.01)

(52) U.S. Cl.
CPC ................. *G06Q 30/0641* (2013.01)

(58) Field of Classification Search
CPC .................................................. G06Q 30/0641
USPC ........................................................ 705/27.1
See application file for complete search history.

(56) References Cited

U.S. PATENT DOCUMENTS

| | | | |
|---|---|---|---|
| 6,871,140 B1 | 3/2005 | Florance et al. | |
| 7,013,290 B2 | 3/2006 | Ananian | |
| 10,529,008 B1* | 1/2020 | Pritchard | ........... G06Q 30/0641 |
| 2008/0209351 A1 | 8/2008 | Macadaan et al. | |
| 2009/0249244 A1 | 10/2009 | Robinson et al. | |
| 2010/0030894 A1 | 2/2010 | Cancel et al. | |
| 2010/0312724 A1 | 12/2010 | Pinckney et al. | |
| 2011/0078055 A1 | 3/2011 | Faribault et al. | |
| 2011/0093361 A1 | 4/2011 | Morales | |
| 2012/0311462 A1 | 12/2012 | Devecka | |
| 2013/0253986 A1* | 9/2013 | Urbanski | ........... G06Q 30/0205 |
| | | | 705/7.34 |
| 2014/0122220 A1 | 5/2014 | Bradley et al. | |
| 2015/0100451 A1* | 4/2015 | Ree | .................... G06Q 30/0621 |
| | | | 705/26.5 |
| 2016/0253710 A1* | 9/2016 | Publicover | ....... H04N 21/25883 |
| | | | 705/14.66 |

OTHER PUBLICATIONS

"'www.wikipedia.com'[online]"Generativedesign, Lastupdated:Jul. 19, 2017,[retrievedon Sep. 19, 2017]RetrievedfromInternet:URL<https://en.wikipedia.org/wiki/Generative_design>2 pages.*

* cited by examiner

*Primary Examiner* — Kathleen Palavecino
(74) *Attorney, Agent, or Firm* — Fish & Richardson P.C.

(57) ABSTRACT

Techniques for improving a customer experience include presenting a selectable component to a user through a graphical user interface of a computing device that is communicably coupled to a server system through a network, the selectable component particularly associated with the user, the server system associated with a vendor and including a plurality of vendor product descriptions; receiving an activation of the selectable component from the user; based on the activation, identifying a plurality of profile data associated with the user; culling the plurality of vendor product descriptions to generate, based on the plurality of profile data, a subset of vendor product descriptions from the plurality of vendor product descriptions; and presenting the subset of vendor product descriptions to the user through the graphical user interface.

22 Claims, 5 Drawing Sheets

CUSTOMER EXPERIENCE

TECHNICAL FIELD

This disclosure generally relates to devices and systems for improving customer experience in online browsing, and, more particularly, improving customer experience in online shopping through informed product suggestion.

BACKGROUND

Shopping online provides customers many choices for a variety of products and services. Online retailers often use different techniques for helping potential customers find the products and services that best fit the customers' specific needs or desires. In some cases, an online vendor requires a potential customer to specifically enter certain information (e.g., personal information, product or service choice criteria) prior to presenting the potential customer with product or service choices.

SUMMARY

This disclosure generally relates to methods, apparatus, and systems for improving customer experience in online browsing, and, more particularly, improving customer experience in online shopping through informed product suggestion.

In a general implementation, a computer-implemented method executed by one or more processors includes presenting a selectable component to a user through a graphical user interface of a computing device that is communicably coupled to a server system through a network, the selectable component particularly associated with the user, the server system associated with a vendor and including a plurality of vendor product descriptions; receiving an activation of the selectable component from the user; based on the activation, identifying a plurality of profile data associated with the user; culling the plurality of vendor product descriptions to generate, based on the plurality of profile data, a subset of vendor product descriptions from the plurality of vendor product descriptions; and presenting the subset of vendor product descriptions to the user through the graphical user interface.

An aspect combinable with the general implementation further includes based on the activation, retrieving the profile data from a data store communicably coupled to the server system associated with the vendor.

In another aspect combinable with any of the previous aspects, the server system is controlled by the vendor.

In another aspect combinable with any of the previous aspects, the profile data includes at least one of at least one user personal preference data; at least one user personal data; or at least one user historical purchase.

In another aspect combinable with any of the previous aspects, the culling includes searching the plurality of vendor production descriptions with at least one profile data; matching at least one of the plurality of vendor product descriptions with the at least one profile data; and based on the matching, adding the matched at least one of the plurality of vendor product descriptions to the subset of vendor product descriptions.

In another aspect combinable with any of the previous aspects, the culling includes generating at least one product constraint based on at least one profile data; matching at least one of the plurality of vendor product descriptions with the at least one product constraint; and based on the matching, adding the matched at least one of the plurality of vendor product descriptions to the subset of vendor product descriptions.

Another aspect combinable with any of the previous aspects further includes determining a sum of: (i) the matches between a particular vendor product description and the at least one product constraint, and (ii) the matches between the particular vendor product description and the at least one profile data; and based on the sum exceeding a threshold, adding the particular vendor product description to the subset of vendor product descriptions.

Another aspect combinable with any of the previous aspects further includes receiving a request from the user; and based on the request, exposing the plurality of profile data to the user through the graphical user interface of the computing device.

Another aspect combinable with any of the previous aspects further includes receiving at least one of an addition or a revision to the plurality of profile data from the user through the graphical user interface; and adjusting the plurality of profile data according to the at least one addition or revision to the plurality of profile data.

In another aspect combinable with any of the previous aspects, the revision includes a change to a privacy setting of at least one of the plurality of profile data.

Another aspect combinable with any of the previous aspects further includes based on the change to the privacy setting of the at least one profile data, removing the at least one profile data from the plurality of profile data associated with the user.

Another aspect combinable with any of the previous aspects further includes based on the activation and prior to identifying the plurality of profile data, requesting a grant of permission to identify the plurality of profile data; and based on the grant of permission, subsequently identifying the plurality of profile data associated with the user.

Another aspect combinable with any of the previous aspects further includes receiving the grant of permission from the user through the graphical user interface.

Another aspect combinable with any of the previous aspects further includes presenting, through the graphical user interface, at least one request for profile information to the user; receiving, from the user, a response to the request, the response including the profile information; and updating the plurality of profile data with the profile information.

Another aspect combinable with any of the previous aspects further includes presenting the selectable component to a user through the graphical user interface of a computing device that is communicably coupled to the server system through the network; receiving an activation of the selectable component from the user; based on the activation, identifying the plurality of profile data associated with the user; culling the plurality of vendor product descriptions to generate, based on the plurality of profile data, a unique vendor product description; and transmitting, for presentation to the user through the graphical user interface, the unique vendor product description.

In another aspect combinable with any of the previous aspects, each of the plurality of vendor product descriptions includes a particular combination of product characteristics, and the unique vendor product description includes a combination of product characteristics that is different than each of the particular combinations of product characteristics of the plurality of vendor product descriptions.

Another aspect combinable with any of the previous aspects further includes selecting at least one product characteristic from at least two of the particular combinations of product characteristics based on the plurality of profile data; and generating the combination of product characteristics of the unique vendor product description from the selected product characteristic.

Another aspect combinable with any of the previous aspects further includes embedding the selectable component in a website that displays the plurality of vendor product descriptions.

Another aspect combinable with any of the previous aspects further includes receiving from the user, through the graphical user interface, a selection of a particular vendor product description from the subset of vendor product descriptions.

In another general implementation, a computing system includes one or more machine learning engines, each of the machine learning engines including one or more hardware processors, each of the machine learning engines configured to communicably couple, through a network, to at least one computing device that includes a graphical user interface, through a network; and one or more memory devices communicably coupled with the one or more machine learning engines, each of the one or more memory devices including tangible, non-transitory, machine-readable media storing instructions, that when executed by the one or more hardware processors, perform operations including presenting a selectable component to a user through the graphical user interface of the computing device, the selectable component particularly associated with the user; receiving an activation of the selectable component from the user; based on the activation, identifying a plurality of profile data associated with the user; culling a plurality of vendor product descriptions stored on the one or more memory devices to generate, based on the plurality of profile data, a subset of vendor product descriptions from the plurality of vendor product descriptions; and transmitting, for presentation to the user through the graphical user interface, the subset of vendor product descriptions.

In another general implementation, a non-transitory computer-readable medium storing software including instructions executable by one or more computers which, upon such execution, cause the one or more computers to perform operations including presenting a selectable component to a user through a graphical user interface of a computing device that is communicably coupled to a server system through a network, the selectable component particularly associated with the user, the server system associated with a vendor and including a plurality of vendor product descriptions; receiving an activation of the selectable component from the user; based on the activation, identifying a plurality of profile data associated with the user; culling the plurality of vendor product descriptions to generate, based on the plurality of profile data, a subset of vendor product descriptions from the plurality of vendor product descriptions; and transmitting, for presentation to the user through the graphical user interface, the subset of vendor product descriptions.

Particular implementations of the subject matter described in this disclosure can be implemented so as to realize one or more of the following advantages. Implementations of the present disclosure may provide for increased efficiency, accuracy, or both, of providing product choices and selections to online customers. Implementations of the present disclosure may provide product choices and selections to online customers based on a single activation of a component on a vendor website by the customer, rather than, for example, based on the customer providing multiple elements of personal information to the vendor. As another example, implementations of the present disclosure may provide a user-authorized sharing of information between a customer and a vendor based on a single activation of a component on a vendor web site by the customer.

The details of one or more implementations of the subject matter of this disclosure are set forth in the accompanying drawings and the description below. Other features, aspects, and advantages of the subject matter will become apparent from the description, the drawings, and the claims.

DETAILED DESCRIPTION

Figure 1:
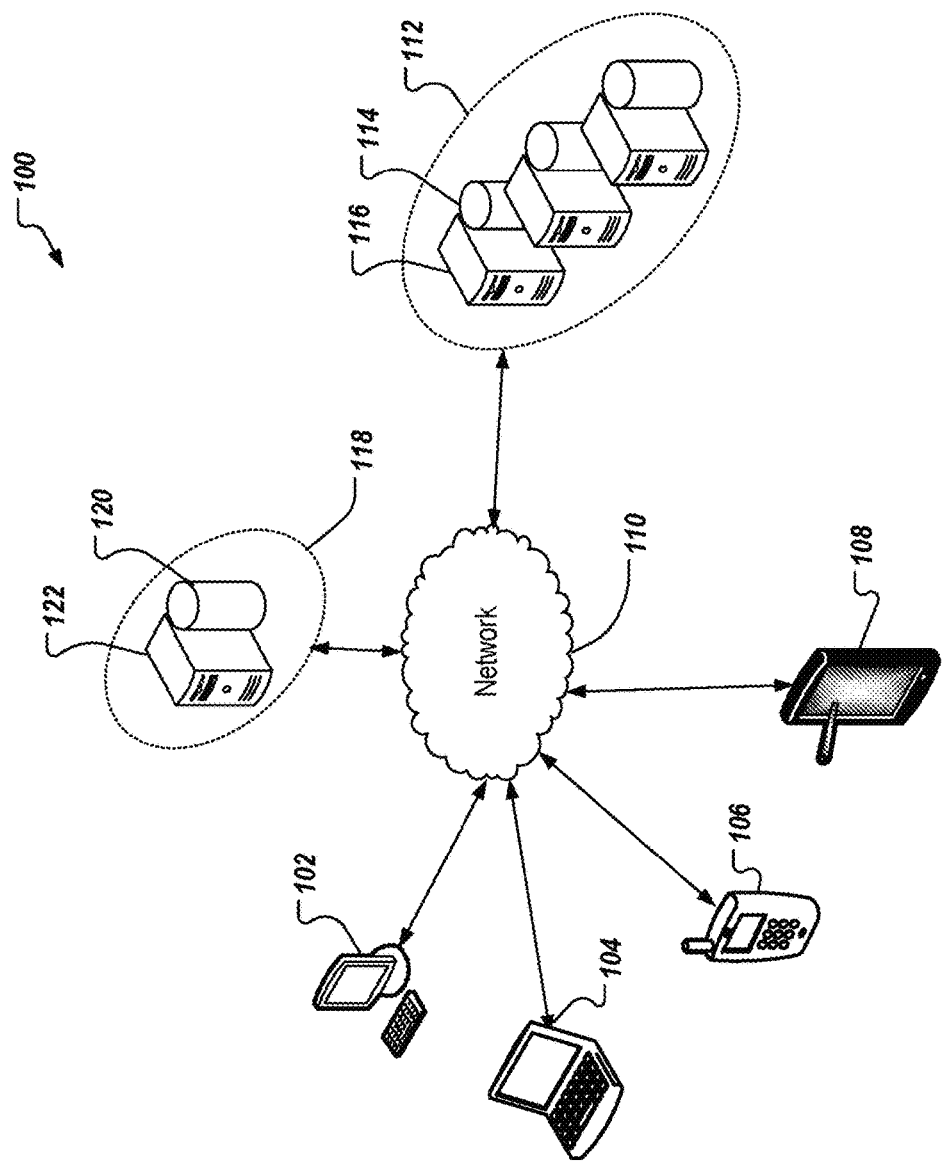
FIG. 1 depicts an example environment in which a system in accordance with implementations of the present disclosure may operate.

This disclosure generally relates to methods, apparatus, and systems for improving a customer experience, such as a customer experience associated with online purchasing or shopping. In example implementations, a product vendor may present (e.g., host, provide, or otherwise expose) an online website (or mobile device or computing application) for a product shopping and purchasing experience to online customers. The website includes a component, such as a selectable or "clickable" icon on one or more web pages of the website, such as, a "home" page or any other page that may include product descriptions. The selectable component may be activated (e.g., "clicked") by a customer, thereby exposing profile information associated with that particular customer to the product vendor. For example, the profile information may include data such as sizes and/or measurements for particular clothing that are specific to that particular customer. The profile data, for example, may include preferences (e.g., styles, colors, types of products) of that particular customer. The profile data, may also include historical purchasing or shopping information of that particular customer, some of which, for instance, may inform the preference data (e.g., past styles of product shopped or purchased, past colors of products shopped or purchased). Based on the exposed profile data, the product vendor (e.g., through the product vendor website execution) may present a narrowed number of product descriptions to the customer for shopping or purchase. Thus, in some aspects, an online customer may execute a single-step selection of the icon or component on a product vendor's website in order to peruse a narrowed list of product descriptions.

Implementations of the present disclosure may be discussed in further detail with reference to an example context. The example context includes an online shopping customer that has access to one or more product vendor websites through one or more networks, including all or a portion of the global network of the Internet. For example, in this example, an online customer is shopping for a pair of shoes on a website of a shoe manufacturer (e.g., Nike®).

In some aspects, implementations described in the present disclosure may rely on machine learning engines and machine learning algorithms to perform generative design tasks. Generative design may, in some aspects, mimic an evolutionary problem-solving process, which uses inputs such as design goals, computes hundreds (if not thousands or millions) of potential solutions, and selects one or more best solutions from the multitude of solution permutations. Indeed, in some aspects, machine learning engines applied to a generative design process may generate or process thousands-or even millions-of design choices, test configurations and learn from each iterative solution. Thus, aspects of the described implementations may use the machine learning engines in a generative design process to generate unique and bespoke solutions beyond those that a human being, alone, could create, to arrive at the best design solution. In some aspects, the machine learning engines and algorithms of the generative design process may rely on algorithmic and parametric modeling within a process that includes a design schema, one or more machine learning engines configured to create variations, and one or more machine learning engines configured to select desirable outcomes.

FIG. 1 depicts an example environment 100 in which a system in accordance with implementations of the present disclosure may operate. Generally, the environment 100 depicts a distributed computing environment that includes multiple user computing devices, such as computing devices 102 (e.g., a desktop computer), 104 (e.g., a laptop computer), 106 (e.g., a smartphone), and 108 (e.g., a tablet). One or more of the user computing devices 102-108 may be particularly associated with one or more online shopping customers. Alternatively, one or more of the user computing devices 102-108 may be public computing devices available for one or more members of the public to access to, e.g., shop or purchase products online.

As shown, each of the user computing devices 102-108 are communicably coupled to network 110. The network 110 can include a large network or combination of networks, such as a local area network (LAN), wide area network (WAN), the Internet, a cellular network, a satellite network, one or more wireless access points, or any appropriate combination thereof connecting any number of the user computing devices 102-108, one or more vendor server systems 112, and one or more machine learning engine systems 118. Generally, in the example environment 100, the network 110 facilitates online communication (e.g., as indicated by the arrow lines) between and among the user computing devices 102-108, the one or more vendor server system 112, and the one or more machine learning engine systems 118.

In this example environment, each of the vendor server systems 112 may be particular associated with a particular vendor or online retailer (e.g., Nike) or a group of vendors or online retailers, including vendors or retailers which present goods or services for sale, lease, rent, or donation. Each illustrated vendor server system 112 includes, e.g., a server system 116 and memory system 114 that, in combination, are operable to store vendor product information and present such vendor product information online to the one or more users or customers at the user computing devices 102-108 (e.g., through a graphical user interface (GUI) at each of the computing devices 102-108) through the network 110, and receive selection and/or purchase information regarding one or more presented vendor products from the one or more users or customers according to the present disclosure.

The illustrated environment 100 also includes one or more machine learning engine systems 118 that are communicably coupled to other components of the environment (e.g., the vendor server systems 112, the user computing devices 102-108, or both) through the network 110. As illustrated, the one or more machine learning engine systems 118 include one or more machine learning engines 122 and one or more memory devices 120. Generally, as described more fully herein, the machine learning engine systems 118 may communicate (e.g., receive and transmit data) with the vendor server systems 112 to, for example, apply machine learning principles to sorting, searching, or culling through vendor product descriptions presented by the vendor server systems 112 to the shoppers on the user computing devices 102-108 according to, for example, customer profile data that is particular to the respective shoppers.

Figure 2:
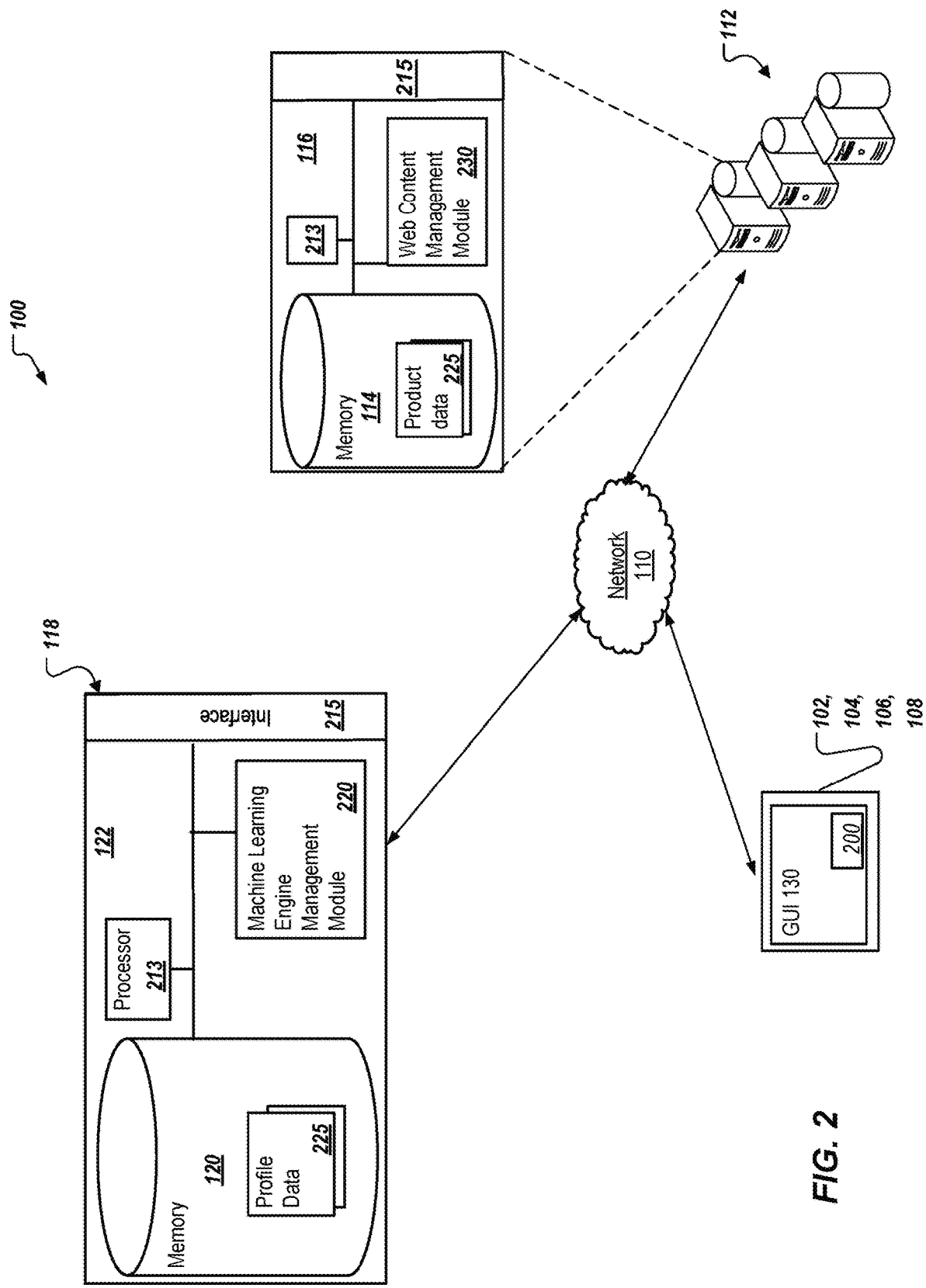
FIG. 2 is a block diagram of an example system in accordance with implementations of the present disclosure.

Turning, briefly to FIG. 2, this figure illustrates, with more specificity, and example implementation of the environment 100 shown in FIG. 1. For example, as shown, each of the user computing devices 102-108 includes a GUI 130 that can display, for example, data (e.g., text, graphics, video, still images, and otherwise) associated with one or more products offered (e.g., for sale) through an online interface of one or more of the vendor server systems 112. The GUI 130 can allow, for example, a customer or user to interact with the online interface (e.g., webpage) of the vendor server systems 112, such as, for instance, view product information (e.g., product data 225), select products to purchase, or otherwise. Thus, in some aspects, reference to GUI 130 may be or include a reference to a web-based interface presented to the users or customers on user computing devices 102-108 from the vendor server systems 112.

As shown in FIG. 2, a portion of the GUI 130 displayed to users or shoppers through the user computing devices 102-108 includes a selectable component 200 (e.g., an icon, "button," or other selectable or "clickable" component). As discussed in more detail herein, activation of the selectable component 200 that is displayed on, e.g., the vendor webpage of the GUI 130, exposes or otherwise transfers all or a portion of a set of profile data 225 (shown on the machine learning engine systems 118) that is particular to the activating user (e.g., online customer). Such profile data 225, as described below, may be used to search, cull, or otherwise narrow the product data 225 that is presented to the customer on the GUI 130.

As shown, each of the machine learning engine systems 118 comprises a one or more computing devices such as servers, cloud servers, personal computers, mobile computing devices, smartphones, or tablet computers. In other words, each machine learning engine system 118 can be provided as one or more computer executable software modules or hardware modules. For example, in some implementations, the machine learning engine systems 220 can be provided as, or include, one or more software modules such as the illustrated machine learning engine management module 220. The machine learning engine management module 220 can be executed by the same computing device or distributed across multiple computing devices. In some implementations, each of the machine learning engine systems 118 can be provided as a hardware module, such as machine learning engine 122, in electronic communication with the machine learning engine management module 220. In some alternative implementations, the machine learning engine management module 220 and the machine learning engine 122 may be combined into one or more computer executable software modules or hardware modules.

As further illustrated, the example implementation of the machine learning engine 122 includes one or more processors 213 and one or more memory devices or databases 120 that store or otherwise reference the customer-specific profile data 225. Communication between the one or more machine learning engine systems 118 and, e.g., the network 110, may be through or with an interface 215 (e.g., hardware, software, firmware, or a combination thereof).

In some implementations, the machine learning engine 122 includes or generates a machine learning model that has been trained to receive model inputs and to generate a predicted output for each received model input to execute one or more processes described in the present disclosure. In some implementations, the machine learning model is a deep model that employs multiple layers of models to generate an output for a received input. For example, the machine learning model may be a deep neural network. A deep neural network is a deep machine learning model that includes an output layer and one or more hidden layers that each apply a non-linear transformation to a received input to generate an output. In some cases, the neural network may be a recurrent neural network. A recurrent neural network is a neural network that receives an input sequence and generates an output sequence from the input sequence. In particular, a recurrent neural network uses some or all of the internal state of the network after processing a previous input in the input sequence to generate an output from the current input in the input sequence. In some other implementations, the machine learning model is a shallow machine learning model, e.g., a linear regression model or a generalized linear model. For example, model inputs may include one or more elements of the profile data 225, or (as described later) constraints that may be generated from the profile data 225, or both. Model inputs may also include, for example, one or more elements of the product data 225.

In some implementations, the machine learning engine 122 can incorporate training data that is specific to a particular user or customer associated with one or more of the user computing devices 102-108. For example, the training data may be specific to a single user (e.g., customer). In some implementations, the machine learning engine 122 can obtain user specific training data during a training period (e.g., a training mode of the machine learning engine 122). For example, the system 118 can acquire training data and train a machine learning model of the machine learning engine 122 by, for example, receiving the one or more changes, additions, or other elements of the profile data 225 from, e.g., the particular user or customer associated with such profile data 225. In some aspects, such particular user training data can be augmented and updated to account, e.g., for a customer's interactions (e.g., browsing, searching, purchasing) with one or more vendor websites.

In some implementations, the machine learning engine 122 can incorporate global training data (e.g., data sets) from a population of user or customer sources, such as sources accessible through the network 112. In some implementations, global training data can be related to users or customers that are similar (e.g., demographically or otherwise) to the particular users or customers associated with the user computing devices 102-108, and associated with a particular selectable component 200. For example, different global training data sets can be obtained that are related to product purchasing or shopping events similar to those being conducted by the customers associated with the user computing devices 102-108. In some aspects, global training data can be crowd sourced.

As further illustrated, each of the vendor server systems 112 comprises a one or more computing devices such as servers, cloud servers, personal computers, mobile computing devices, smartphones, or tablet computers. In other words, each vendor server system 112 can be provided as one or more computer executable software modules or hardware modules. For example, in some implementations, the vendor server systems 112 can be provided as, or include, one or more software modules such as the illustrated web content management module 230. The web content management module 230can be executed by the same computing device or distributed across multiple computing devices. In some implementations, each of the vendor server systems 112 can be provided as a hardware module, such as one or more servers 116, in electronic communication with the web content management module 230. In some alternative implementations, the web content management module 230 and the server 116 may be combined into one or more computer executable software modules or hardware modules.

As further illustrated, the example implementation of the server 116 includes one or more processors 213 and one or more memory devices or databases 114 that store or otherwise reference the product data 225. Communication between the one or more vendor server systems 112 and, e.g., the network 110, may be through or with an interface 215 (e.g., hardware, software, firmware, or a combination thereof).

Generally, each of the vendor server systems 112 may operate to present (e.g., expose, transmit, or otherwise) product data 225 through the GUI 130 to one or more online shoppers. Further, as described more fully herein, each of the vendor server systems 112 may operate to search or cull a particular group of the product data 225 (that may, in some aspects, include all of the product data 225 on a particular vendor server system 112) according to one or more portions of the profile data 225 based on activation of the selectable component 200.

Figure 3A:
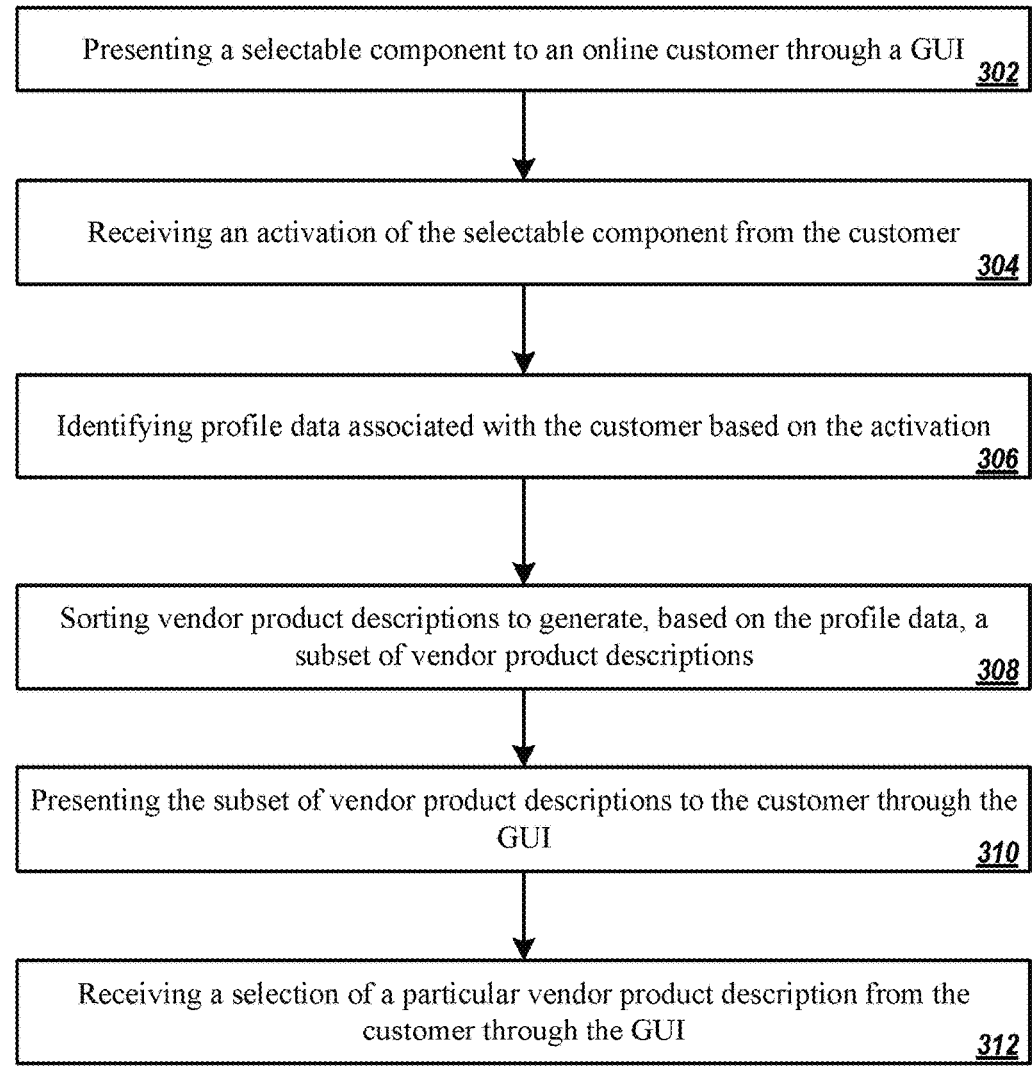
FIGS. 3A-3B are flowcharts depicting example processes for improving a customer experience.

FIG. 3A depicts a flowchart of an example process 300 for improving a customer experience, such as, an online customer experience in shopping for or purchasing a vendor product that can be executed in accordance with implementations of the present disclosure. In some implementations, the process 300 can be provided as one or more computer-executable programs executed using one or more computing devices. In some examples, the process 300 can be executed within the example environment 100 shown in FIGS. 1-2. Process 300, as described here, may refer to the example context of an online shopping customer that has access to one or more product vendor websites through one or more networks, including all or a portion of the global network of the Internet. The online customer is shopping for a pair of shoes on a web site of a shoe manufacturer (e.g.,Nike®).

In some aspects, process 300 may begin at step 302, which includes presenting a selectable component to an online customer through a GUI. For example, in some aspects, a produce vendor—such as a shoe manufacturer in the contextual example—may maintain, control, or own (or contact with a third party to maintain or control) an online store (e.g., from a vendor server system 112) that is accessible through a website available to online customers (e.g., customers through user computing systems 102-108). The online store may include, for instance, product descriptions (e.g., product type, model, size, cost, and other data) that are displayed to the online customer through the customers computing system (e.g., 102-108), such as through a GUI of the customer's computing system (e.g., GUI 130).

In some aspects, the selectable component (e.g., component 200) can include a selectable or clickable icon that is displayed, e.g., on the online store (e.g., website) of the vendor. In some aspects, the selectable component may be displayed on particular web pages of the online store, such as web pages that display product data of a product (or many products) that the vendor offers through the online store.

Process 300 may continue at step 304, which includes receiving an activation of the selectable component from the customer. For example, an online customer, through the GUI 130 of the user computing device 102-108, may select (e.g., click, touch, highlight) the selectable component to activate further steps in the process 300. In activating the selectable component, the online customer may transmit (or the vendor server system may recognize) data to the vendor server system (or the vendor server system may recognize or identify such an activation without a data transmission occurrence) that indicates an activation of the selectable component.

Process 300 may continue at step 306, which includes identifying profile data associated with the customer based on the activation. For example, in some aspects, once the online customer has activated the selectable component, the vendor server system may identify the profile data that is associated, e.g., particularly, with the online customer (e.g., only with the online customer and no other person). In some aspects, such profile data, upon activation of the selectable component, may be exposed to the vendor server system through another component of the environment 100, such as by the machine learning engine systems 118. In some aspects, one or more of the machine learning engine systems 118 may be secured from (e.g., through firewalls or other secure hardware/software devices) from the vendor server system that receives the activation indication of the selectable component. For instance, user security of profile data may be a particular concern to both the online customer and the online vendor. In some aspects, for example, profile data may include personal data, such as gender, age, body measurements and sizes, geolocation information (e.g., address, zip code, telephone number), as well as other personal information, such as personal financial (e.g., payment) information). Such personal profile data may be secured, e.g., at the machine learning engine systems 118.

Indeed, for situations in which the systems and environments discussed here collect and/or use personal information about users, the users may be provided with an opportunity to enable/disable or control programs or features that may collect and/or use personal information (e.g., information about a user's social network, social actions or activities, a user's preferences or a user's current location). In addition, certain data may be treated in one or more ways before it is stored or used, so that personally identifiable information associated with the user is removed. For example, a user's identity may be anonymized so that the no personally identifiable information can be determined for the user, or a user's geographic location may be generalized where location information is obtained (such as to a city, ZIP code, or state level), so that a particular location of a user cannot be determined.

In some aspects, the profile data exposed or otherwise available to the vendor server system may include an online customer's preferences as well as personal information. Preferences, in some aspects, may include data such as product color preference, product size preference, product model or type preference, or other flexible constraints. For example, in some aspects, a preference, as a flexible constraint, may be a desire that an online customer has for a particular characteristic of a product, but may not be a requirement for that particular characteristic. In some instances, however, customer preferences within the profile data may be or include a requirement of the online customer's for such a particular characteristic (e.g., in the case of shoe wear, a size of a particular type of shoe, such as athletic shoe wear). Thus, the profile data exposed to the vendor server system may include all or portions of an online customer's profile data that includes constraints and preferences (each of which may be personal data as well, such as data that provides identifying characteristics of the particular online customer).

Process 300 may continue at step 308, which includes sorting vendor product descriptions to generate, based on the profile data, a subset of vendor product descriptions. For example, in some aspects, the vendor server system (or machine learning engine system) may sort, cull, match, or otherwise search through the available product description data to determine or generate a subset of the product description data that matches (e.g., exactly or similarly) to one or more elements of the profile data.

In some aspects, certain profile data may be exactly matched to product description data in order for the product associated with the description data to be included within the subset of products. For example, an online customer's profile data may include a particular shoe size. Thus, as the online customer activates the selectable component that is displayed on, e.g., Nike's web page showing all running shoes, the profile data of the customer's shoe size may be exposed to the vendor server system. In step 308, therefore, only shoes that have a size that matches (e.g., exactly or substantially, such as within a half size) the profile data shoe size are placed into the subset of product descriptions.

In some aspects, the profile data of the customer may not be exactly matched in step 308, but instead, certain profile data may generate one or more constraints that is matched to product description data. For example, in some aspects, profile data that does not describe requirements of a product may still inform the search for the subset of product description data. As an example, profile data such as "low price" may not be exactly matched to product criteria (e.g., because price is relative). However, the one or more machine learning engine systems 118 may search a data corpus (e.g., accessible through the network 110) to develop or generate a constraint or requirement for the product description search based on this profile data preference. For instance, the machine learning engine systems 118 may apply machine learning techniques to the data corpus to determine that "low price", in the context of athletic shoes, refers to shoes within the $30-$60 USD price range. Therefore, the vendor server systems may apply this criteria to the product description data to generate product descriptions for the subset that meet this criteria.

In some aspects, product description data may match or meet some, but not all, of the constraints or preferences (or both) of the profile data. In some aspects, the machine learning engine systems (or vendor server systems, or both) may determine whether or not a particular product description is included within the subset of product descriptions based on, for instance, how many constraints or preferences (or both) are matched (e.g., exactly or substantially) with the product description data. For example, shoes that match the correct shoe size, and the preferred color (according to the profile data preferences), but do not match a price constraint, may still be included within the subset of product descriptions for meeting two-thirds of the constraints or preferences of the profile data. In some instances, a threshold of matches (e.g., exact or substantial) may be variable and adjustable (e.g., at least one, at least one-half, or otherwise).

In some aspects, step 308 may include generating a bespoke, or custom, product based on the exposed profile data. For example, in some aspects, step 308 may result in no product descriptions being included within the subset of product descriptions (e.g., due to no or insufficient matches of product description data and profile data). Thus, in such instances, the machine learning engine systems may generate, from the accessible corpus data, a product that includes product description data that meets (e.g., matches exactly or substantially the profile data that is particular to the customer. For instance, the machine learning engine systems may derive a new product description that includes at least one, and in some cases, all of the constraints or preferences (or both) of the profile data. In some aspects, the combination of the constraints or preferences (or both) may be unique (e.g., different than any existing combination of product description data) that is stored on the vendor server system.

Alternatively or additionally, step 308 may result in some product descriptions being included within the subset of product descriptions. However, in such instances, the machine learning engine systems may still generate, from the accessible corpus data, a product that includes product description data that meets (e.g., completely matches, even substantially, profile data or matches more profile data, even substantially, than existing product descriptions that are included within the subset).

Process 300 may continue at step 310, which includes presenting the subset of vendor product descriptions to the customer through the GUI. For example, once the subset of product descriptions have been generated in step 308, the vendor server system may present (e.g., through a new webpage, pop-up window, or otherwise), the subset of product descriptions (e.g., that may be less than a total number of product descriptions for a particular product type) to the customer through the GUI.

Process 300 may continue at step 312, which includes receiving a selection of a particular vendor product description from the customer through the GUI. For example, in some aspects, the customer may select one or more of the subset of product descriptions (e.g., by selecting or clicking on the product description) for purchase or for further information.

Process 300 can include other, additional (or alternative) steps. For example, in some aspects, the selected product may represent or describe a manufacturable or buildable component, device, or apparatus. Thus, the environment 100 may perform the additional step of communicating with (and/or controlling) manufacturing equipment to build or make (e.g., through three-dimensional printing, injection molding, or other automated physical building or modeling process) a prototype (e.g., a physical representation) of the selected product. As another example, the system 200 may communicate with a tool system to build, manufacture, or otherwise generate a die, mold, or form for the selected product (e.g., for future mass production).

Figure 3B:
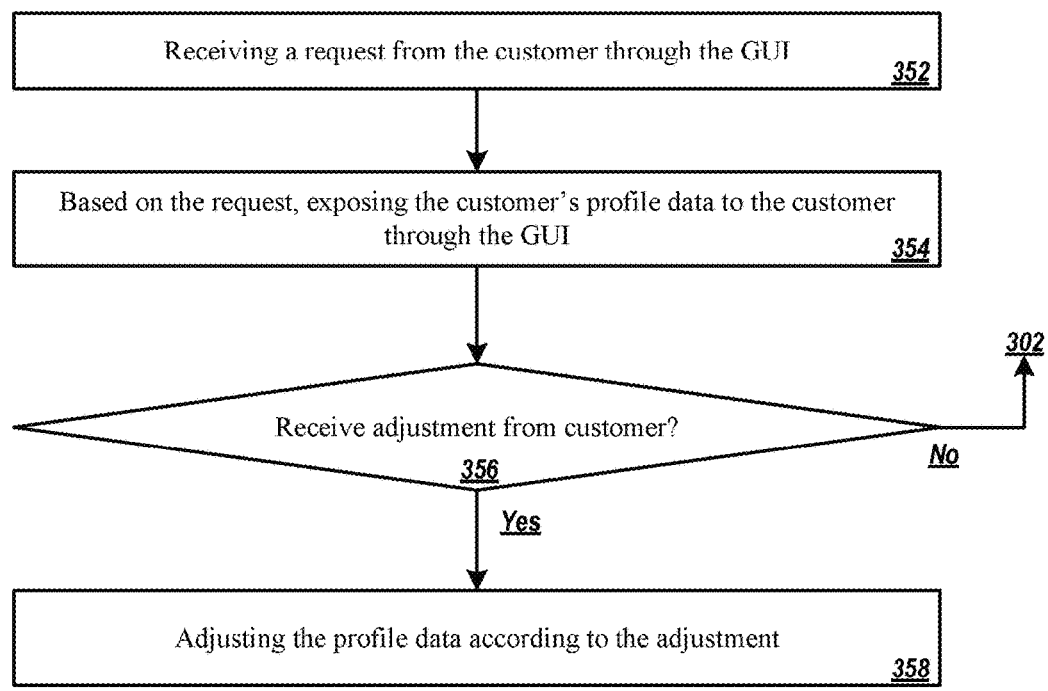

FIG. 3B illustrates an example process 350 for managing profile data according to the present disclosure. For example, process 350 may be executed to allow a customer (e.g., from a user computing device 102-108) to view and/or change the profile data that is particular associated with that customer. In some implementations, the process 350 can be provided as one or more computer-executable programs executed using one or more computing devices. In some examples, the process 350 can be executed within the example environment 100 shown in FIGS. 1-2. Process 350 may begin at step 352, which includes receiving a request from the customer through the GUI. For example in some aspects, the online customer may request (e.g., through the selectable component) to view the profile data that is particular associated with the customer.

Process 350 may continue at step 354, which includes exposing the customer's profile data to the customer through the GUI based on the request. For example, in some aspects, the vendor server system or machine learning engine system may present (e.g., through the GUI 130) the profile data to the online customer. The profile data may include personal data of the online customer, as well as preference data of the customer.

Process 350 may continue at step 356, which includes a determination of whether an adjustment of the exposed profile data is received from the online customer. If the determination is negative, process 350 may return to step 302 of process 300. If the determination is affirmative, then process 350 may continue to step 358.

Step 358 includes adjusting the profile data according to the adjustment. For example, in some instances, the online customer may adjust profile data simply by changing one or more personal data (e.g., address, zip code, shoe size, or otherwise). In some instances, the customer may add additional profile data (e.g., an additional preference of product color or type). In some instances, the online customer may remove a particular element (or elements) of the profile data, such as removing a preferred product color.

In some aspects, the adjustment may include a change to a privacy or security setting of the profile data. For example, in some instances, the change may be to restrict access to one or more elements of the profile data (e.g., address, gender, race, ethnicity, or otherwise). In some aspects, the access may be restricted to one or more of the vendor server systems. As another example, the adjustment may include requiring the vendor server system to request permission (e.g., through the GUI) prior to identifying, receiving, or being exposed to the profile data. As another example, the adjustment may include removing certain personal data.

Figure 4:
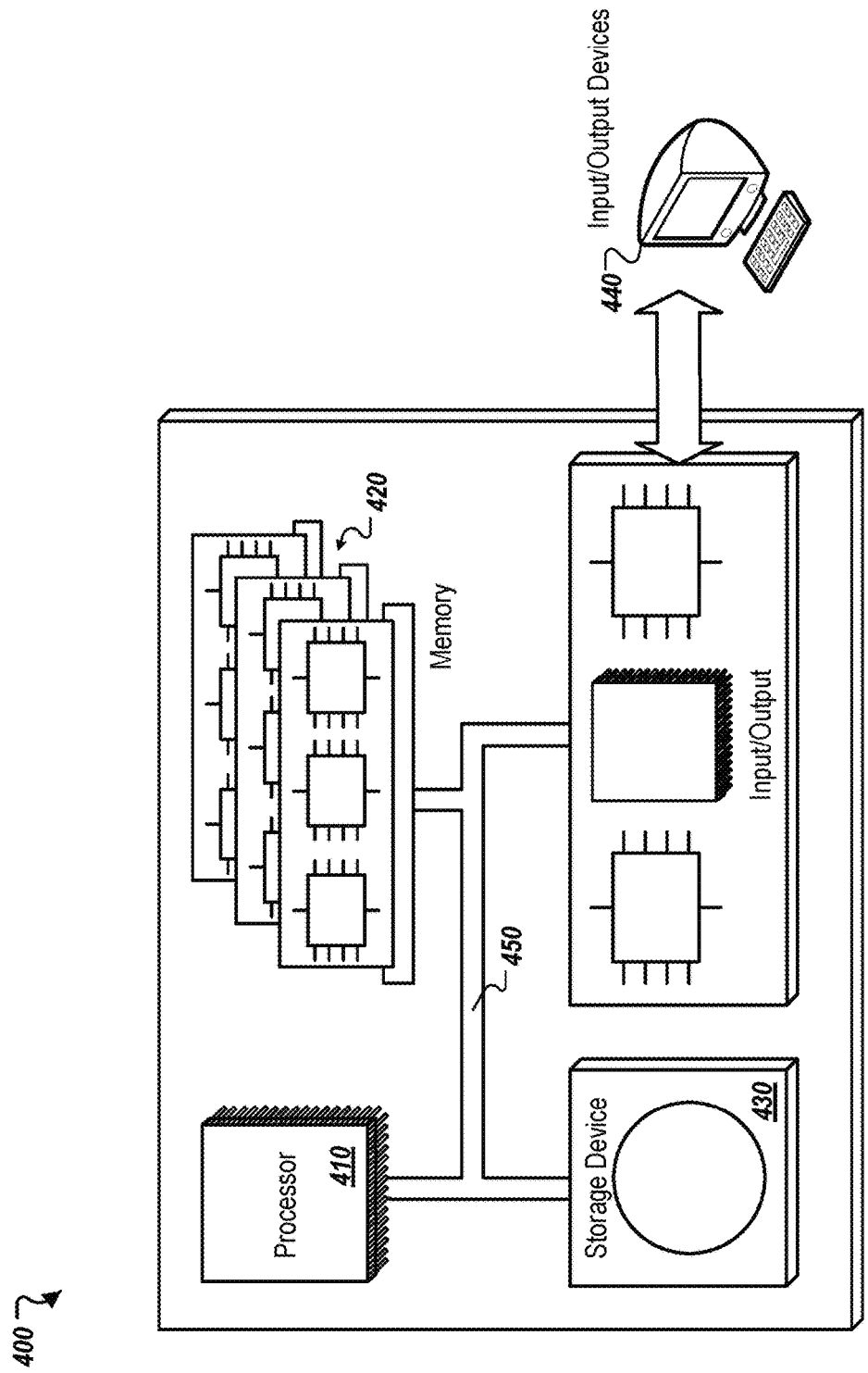
FIG. 4 is a schematic diagram of an example computer system 400.

FIG. 4 is a schematic diagram of an example computer system 400. The system 400 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., machine learning engine(s)) and their structural equivalents, or in combinations of one or more of them. The system 400 is intended to include various forms of digital computers, such as laptops, desktops, workstations, personal digital assistants, servers, blade servers, mainframes, and other appropriate computers, including vehicles installed on base units or pod units of modular vehicles. The system 400 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 400 includes a processor 410 (e.g., processor 213), a memory 420, a storage device 430, and an input/output device 440. Each of the components 410, 420, 430, and 440 are interconnected using a system bus 450. The processor 410 is capable of processing instructions for execution within the system 400. The processor may be designed using any of a number of architectures. For example, the processor 410 may be a CISC (Complex Instruction Set Computers) processor, a RISC (Reduced Instruction Set Computer) processor, or a MISC (Minimal Instruction Set Computer) processor.

In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computing system, comprising:
one or more machine learning engines, each of the machine learning engines comprising one or more hardware processors, each of the machine learning engines configured to communicably couple, through a network, to at least one computing device that comprises a graphical user interface, through a network; and
one or more memory devices communicably coupled with the one or more machine learning engines, each of the one or more memory devices comprising tangible, non-transitory, machine-readable media storing instructions, that when executed by the one or more hardware processors, perform operations comprising:
presenting, by a vendor system, a plurality of vendor product descriptions and a selectable component to a user through the graphical user interface of the computing device, the selectable component being particularly associated with providing access to a set of profile data that is associated with the user and that is not yet accessible by the vendor system, to the vendor system;
receiving, by the vendor system, an activation of the selectable component that provides the vendor system with access to the set of profile data, from the user;
based on receiving the activation of the selectable component from the user, obtaining, by the vendor system, access to the set of profile data of the user from a database of profile data, then training the one or more machine learning engines using the set of profile data as training data;
culling the presented plurality of vendor product descriptions to generate, by the one or more machine learning engines of the vendor system and based on obtaining access to the set of profile data, a subset of vendor product descriptions from among the plurality of vendor product descriptions; and
presenting, by the vendor system and to the user through the graphical user interface, the subset of the vendor product descriptions.

2. A non-transitory computer-readable medium storing software comprising instructions executable by one or more computers which, upon such execution, cause the one or more computers to perform operations comprising:
presenting, by a vendor system, a plurality of vendor product descriptions and a selectable component to a user through the graphical user interface of the computing device, the selectable component being particularly associated with providing access to a set of profile data that is associated with the user and that is not yet accessible by the vendor system, to the vendor system;
receiving, by the vendor system, an activation of the selectable component that provides the vendor system with access to the set of profile data, from the user;
based on receiving the activation of the selectable component from the user, obtaining, by the vendor system, access to the set of profile data of the user from a database of profile data, then training one or more machine learning engines using the set of profile data as training data;
culling the presented plurality of vendor product descriptions to generate, by the one or more machine learning engines of the vendor system and based on obtaining access to the set of profile data, a subset of vendor product descriptions from among the plurality of vendor product descriptions; and
presenting, by the vendor system and to the user through the graphical user interface, the subset of the vendor product descriptions.

3. A computer-implemented method executed by one or more processors, the method comprising:
presenting, by a vendor system, a plurality of vendor product descriptions and a selectable component to a user through the graphical user interface of the computing device, the selectable component being particularly associated with providing access to a set of profile data that is associated with the user and that is not yet accessible by the vendor system, to the vendor system;
receiving, by the vendor system, an activation of the selectable component that provides the vendor system with access to the set of profile data, from the user;
based on receiving the activation of the selectable component from the user, obtaining, by the vendor system, access to the set of profile data of the user from a database of profile data, then training one or more machine learning engines using the set of profile data as training data;
culling the presented plurality of vendor product descriptions to generate, by the one or more machine learning engines of the vendor system and based on obtaining access to the set of profile data, a subset of vendor product descriptions from among the plurality of vendor product descriptions; and
presenting, by the vendor system and to the user through the graphical user interface, the subset of the vendor product descriptions.

4. The computer-implemented method of claim 3, comprising based on receiving the activation, retrieving the profile data from the database of profile data that is associated with the vendor.

5. The computer-implemented method of claim 4, wherein the vendor system is controlled by the vendor.

6. The computer-implemented method of claim 3, wherein the profile data comprises at least one of:
at least one user personal preference data;
at least one user personal data; or
at least one user historical purchase.

7. The computer-implemented method of claim 3, wherein the culling comprises:
searching the plurality of vendor production descriptions with at least one profile data;
matching at least one of the plurality of vendor product descriptions with the at least one profile data; and
based on the matching, adding the matched at least one of the plurality of vendor product descriptions to the subset of vendor product descriptions.

8. The computer-implemented method of claim 7, wherein the culling comprises:
generating at least one product constraint based on at least one profile data;
matching at least one of the plurality of vendor product descriptions with the at least one product constraint; and based on the matching, adding the matched at least one of the plurality of vendor product descriptions to the subset of vendor product descriptions.

9. The computer-implemented method of claim 8, comprising:
determining a sum of: (i) the matches between a particular vendor product description and the at least one product constraint, and (ii) the matches between the particular vendor product description and the at least one profile data; and
based on the sum exceeding a threshold, adding the particular vendor product description to the subset of vendor product descriptions.

10. The computer-implemented method of claim 3, comprising:
receiving a request from the user; and
based on the request, exposing the set of profile data to the user through the graphical user interface of the computing device.

11. The computer-implemented method of claim 10, comprising:
receiving at least one of an addition or a revision to the set of profile data from the user through the graphical user interface; and
adjusting the set of profile data according to the at least one addition or revision to the set of profile data.

12. The computer-implemented method of claim 11, wherein the revision comprises a change to a privacy setting of at least one of the set of profile data.

13. The computer-implemented method of claim 11, comprising based on the change to the privacy setting of the at least one profile data, removing the at least one profile data from the set of profile data associated with the user.

14. The computer-implemented method of claim 3, comprising:
based on receiving the activation and prior to obtaining the set of profile data, requesting a grant of permission to identify the set of profile data; and
based on the grant of permission, subsequently identifying the set of profile data associated with the user.

15. The computer-implemented method of claim 14, comprising receiving the grant of permission from the user through the graphical user interface.

16. The computer-implemented method of claim 3, comprising:
presenting, through the graphical user interface, at least one request for profile information to the user;
receiving, from the user, a response to the request, the response comprising the profile information; and
updating the set of profile data with the profile information.

17. The computer-implemented method of claim 3, comprising:
presenting the selectable component to a user through the graphical user interface of a computing device that is communicably coupled to the vendor system through the network;
receiving an activation of the selectable component from the user;
based on receiving the activation, identifying the set of profile data associated with the user;
culling the plurality of vendor product descriptions to generate, based on the set of profile data, a unique vendor product description; and
transmitting, for presentation to the user through the graphical user interface, the unique vendor product description.

18. The computer-implemented method of claim 17, wherein each of the plurality of vendor product descriptions comprises a particular combination of product characteristics, and the unique vendor product description comprises a combination of product characteristics that is different than each of the particular combinations of product characteristics of the plurality of vendor product descriptions.

19. The computer-implemented method of claim 18, comprising:
selecting at least one product characteristic from at least two of the particular combinations of product characteristics based on the set of profile data; and
generating the combination of product characteristics of the unique vendor product description from the selected product characteristic.

20. The computer-implemented method of claim 3, comprising embedding the selectable component in a website that displays the plurality of vendor product descriptions.

21. The computer-implemented method of claim 3, comprising receiving from the user, through the graphical user interface, a selection of a particular vendor product description from the subset of vendor product descriptions.

22. The method of claim 3, comprising:
performing, by the vendor system, generative design based on the obtained set of profile data to generate one or more unique product descriptions that are not among the plurality of vendor product descriptions, and
presenting, by the vendor system and to the user through the graphical user interface, the unique product descriptions along with the subset of the vendor product descriptions.

* * * * *